United States Patent [19]

Bone

[11] 4,136,381

[45] Jan. 23, 1979

[54] DC TROUBLE LAMP

[76] Inventor: Everett W. Bone, 2206 Melbourne Ct., Fort Wayne, Ind. 46804

[21] Appl. No.: 802,796

[22] Filed: Jun. 2, 1977

[51] Int. Cl.$^{2}$ .................... F21V 3/00

[52] U.S. Cl. .................... 362/311; 362/258; 362/344; 362/376; 362/387

[58] Field of Search .................... 362/311, 258, 387, 344, 362/376; 340/90; 339/88 R, 188 R

[56] References Cited

U.S. PATENT DOCUMENTS

| | | | |
|---|---|---|---|
| 2,812,423 | 11/1957 | Penna | 340/90 |
| 3,809,883 | 5/1974 | Goodwin | 362/258 |
| 3,945,702 | 3/1976 | Poliak et al. | 339/88 R |

OTHER PUBLICATIONS

J. C. Whitney & Co. Catalog, Apr., 1977.

*Primary Examiner*—Stephen J. Lechert, Jr.
*Attorney, Agent, or Firm*—John F. Hoffman

[57] ABSTRACT

A combination trouble lamp and emergency flasher which is adapted to be connected directly to the terminals of a vehicle battery. The device comprises an adaptor cable having a pair of spring biased battery clamps which connect to a female twist-to-lock connector through a pair of heavy gauge insulated cables. The lamp comprises a housing having a socket in which a DC electric light bulb is received, an arcuate reflector made of a highly visible translucent plastic material behind the bulb, and a protective cage hingedly connected to the reflector and positioned in front of the bulb. The lamp includes a relatively long, light gauge power cord which terminates in a male twist-to-lock plug adapted for connection to the receptacle of the adaptor leads. A flasher unit selectively inserted into an external receptacle within the housing causes the bulb to blink on and off and this will appear as a flashing, colored light source when viewed from behind the translucent shade so that the lamp may also serve as an emergency signal light. In another embodiment, the adaptor leads have a dual socket connector so that another pair of battery clamps may be connected thereto for the purpose of jumping a disabled vehicle yet permitting the lamp to remain plugged in.

6 Claims, 4 Drawing Figures

DC TROUBLE LAMP

BACKGROUND OF THE INVENTION

The present invention relates to electric lamps and in particular to a combination trouble lamp and emergency flasher adapted for direct connection to the battery of a vehicle.

A wide variety of trouble lamps and auxiliary emergency flashers are known. In the case of trouble lamps, they are customarily used for making repairs on a vehicle either during daylight hours or at night and customarily have a reflective shade, protective cage, and a hook for hanging the lamp from a convenient location on the vehicle. One such lamp which is presently commercially available is made of a plastic material and has a reflective shade which is translucent and the light produced by the bulb is visible therethrough at night. The lamp has a power cord and terminates in a standard two prong plug adapted for connection to 110 volt AC current.

Another class of prior art devices include adaptors for insertion into the cigarette lighter socket located on the vehicle dashboard. This necessitates that the power cord for the trouble lamp or warning blinker be run through an open window or door which is often inconvenient when working under the vehicle hood. Furthermore, these devices will not accomodate jumper cables for the purpose of starting a disabled vehicle and the power cord is generally not sufficiently heavy to accomodate the large current flow which is required.

One prior art device, which is shown in U.S. Pat. No. 2,932,018, is an electric lamp having a clear lens and a colored lens positioned on opposite sides of the light bulb and and a selectively switched flasher which causes the bulb to blink on and off. No reflective shade is provided, however, so the amount of light which is available for making repairs and the like is reduced.

Another prior art device is shown in U.S. Pat. No. 3,439,159 and has an extension ring made of a transparent red material which extends forward of the clear lens so that when the unit is viewed from the side, the emitted light will appear red in color.

SUMMARY OF THE INVENTION

The present invention overcomes the disadvantages of the prior art by providing a combination trouble lamp and emergency flasher having a curved translucent shade positioned directly behind the light bulb so as to reflect most of the light which is produced yet permit a certain portion to be transmitted rearwardly. The shade is of a highly visible color so that as the bulb flashes on and off, it will appear as a blinking colored light which serves as a warning signal to oncoming motorists.

The automatic flasher of the present invention is a separate unit which is inserted into an external receptacle in the lamp housing. The receptacle provides an open circuit in series with the light bulb and includes a pair of recessed contact elements which are adapted to be contacted by corresponding conductive blades associated with the flasher unit. A protective cap, including a pair of short-circuited contact blades, is adapted to be inserted into the receptacle so that the series break in the current supply circuit for the light bulb is bridged when the flasher is not in use. By locating the flasher externally to the lamp, the heat generated there by is easily dissipated.

Another feature which distinguishes the present invention is the provision of a separate battery clamp adaptor into which the lamp is plugged. The adaptor is made of heavy gauge wire and includes a connector on one end which is adapted to receive a complementary connector which in turn is connected to the leads of a second pair of battery clamps also through heavy gauge cables. This enables the adaptor to double as battery jumper cables. If desired, a special double socket receptacle may be provided on the adaptor so that the trouble lamp can be operated at the same time.

Specifically, the present invention contemplates a DC trouble lamp comprising: a housing having a handle portion, an electric light bulb socket in the housing having a direct current light bulb received therein, a curved translucent shade made of a highly visible color connected to the housing and positioned behind the bulb, a protective cage positioned in front of the bulb, a hook secured to the top of the lamp, a power cord electrically connected to the socket for supplying electric current thereto, a pair of heavy gauge insulated electrical leads each terminating in a spring biased manually operated battery terminal clamp at one end thereof, a pair of cooperating separable electrical connectors connected respectively to one end of the power cord and to the free ends of the leads and having means for positively locking them together, the power cord being of a substantially lighter gauge and of a substantially longer length than the leads, and external, selectively operable flasher means on the housing for periodically interrupting the supply of electric current to the bulb.

It is an object of the present invention to provide a DC vehicle trouble lamp serving the dual purpose of an illumination lamp and a highly visible emergency flasher.

Another object of the present invention is to provide a DC trouble lamp which is connected directly to the vehicle battery terminal through heavy gauge adaptor cables which can also be utilized for jumping the battery of a disabled vehicle.

A further object of the present invention is to provide a DC trouble lamp having a specially designed, two-piece jumper cable to which the lamp can be directly connected so as to provide either working illumination or a flashing emergency signal while jumping a disabled vehicle.

Another object of the present invention is to provide a DC trouble lamp which is of simple and rugged construction.

A still further object of the present invention is to provide a DC trouble lamp having a separable plug-type flasher unit which is adapted to be inserted into an external receptacle on the lamp housing.

Yet another object of the present invention is to provide a DC trouble lamp having a multiplicity of uses covering a wide variety of situations including road emergencies, vehicle repairs and campsite lighting.

These and other features and objects of the present invention and the manner of attaining them will become more apparent and the invention itself will best be understood by reference to the following description of several embodiments of the invention taken in conjunction with the accompanying drawings.

DESCRIPTION OF THE PREFERRED EMBODIMENTS

Figures 1, 2, 3, 4:
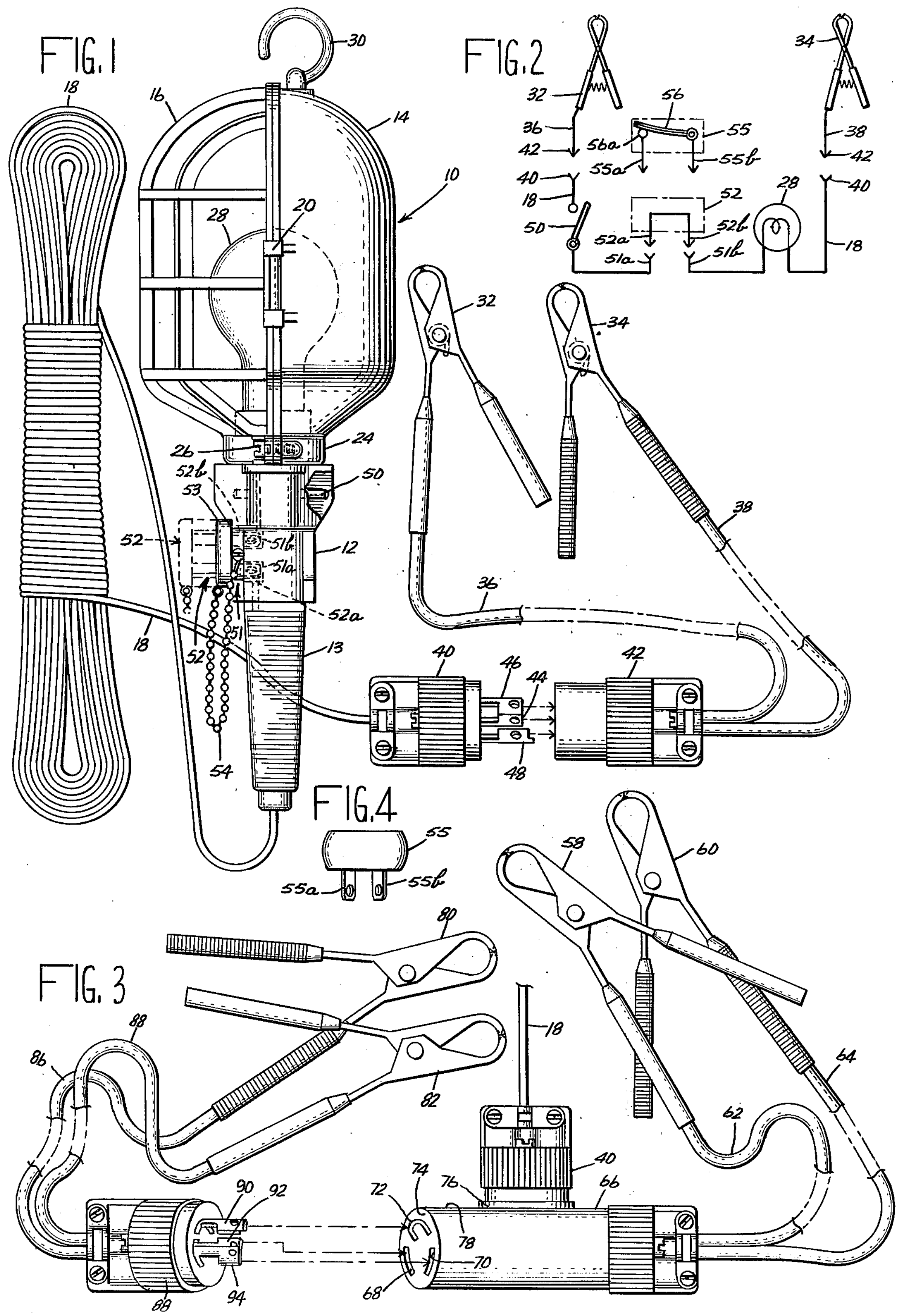
FIG. 1 is a side elevational view of the trouble lamp according to the present invention.
FIG. 2 is a schematic diagram showing the electrical circuit of the trouble lamp illustrated in FIG. 1.
FIG. 3 is a side elevational view shown partly in perspective of a further embodiment of the present invention.
FIG. 4 is an elevational view of the plug-in flasher unit of the present invention.

Referring now to the drawings, the DC trouble lamp 10 of the present invention comprises a housing 12, handle portion 13, a reflective shade 14, a protective cage 16 and a two or three wire power cord 18. Shade 14 and cage 16, which are pivotally secured together by means of hinge 20, are secured to housing 12 by clamp 22 which is secured to the neck portion 24 of shade 14 by means of screws 26.

Shade 14 is preferably made of a propylene plastic and is sufficiently thin that bulb 28, when lit, will be visible therethrough in darkness or low light conditions. To enhance the visibility of the light emitted by bulb 28, shade 14 is preferably a bright yellow or red-orange color. This causes the light emitted by bulb 28 to appear as a flashing light source when the flasher mechanism described below is inserted. A hook 30 on shade 14 enables the lamp 10 to be conveniently hung from a raised vehicle hood as repairs are made.

The power cord 18 may be any desired length, such as 25 or 50 feet, and consists of a pair of conductors insulated from each other and enclosed in an outer jacket. Since the only current normally carried by cord 18 is that which is necessary to cause bulb 28 to glow, it may be of relatively light gauge as, for example, 18 gauge. To minimize the chances of electrical shorting due to moisture, cord 18 is preferably molded integrally with handle 13.

A pair of spring biased battery terminal clips 32 and 34 are electrically connected to a pair of heavy gauge battery jumper cables 36 and 38, respectively. For the reasons which will be pointed out below, cables 36 and 38 are of sufficiently heavy gauge to carry starting current when a low charge level battery is jumped. Typically, cables 36 and 38 would be 8 or 10 gauge conductors covered by an insulating plastic jacket, and are approximatly two feet in length.

Power cord 18 is connected to cables 36 and 38 by means of a pair of separable electrical connectors 40 and 42. Connectors 40 and 42 are of the type which can be locked together by inserting the blades 44, 46 and 48 of the male connector 40 into the matching slots (not shown) of the female receptacle or connector 42 and then rotating them in opposite directions. Connectors 40 and 42 may be Pass and Seymour brand TURNLOK connectors such as those described in Grainger's Catalog No. 347, Spring 1977. Although three-blade connectors are shown, one of the blades 44, 46 or 48 may function as a dummy blade in the case of two wire conductors or, alternatively, power cord 18 may be a three wire cord with a separate grounding conductor which would then connect with a third cable (not shown) similar to cables 36 and 38.

Contained within housing 12 is an on-off power switch 50, which partially completes the series circuit from one of the battery clamps 36 and 38 to light bulb 28. Also contained within housing 12 is a standard female flasher receptacle 51 having a pair of contact elements 51*a* and 51*b* received within recesses in housing 12. With reference to FIG. 2, contacts 51*a* and 51*b* form an open circuit in the series current supply circuit for light bulb 28. A protective cap 52 having a plastic base 53 and a pair of electrically short-circuited contact blades 52*a* and 52*b* adapted to be inserted into the recesses of receptacle 51 and make contact with contact elements 51*a* and 51*b* is attached to housing 12 by means of chain 54. A separate flasher unit 55 having a pair of contact blades 55*a* and 55*b* is also adapted to be inserted into receptacle 51 such that its blades 55*a* and 55*b* make contact with contacts 51*a* and 51*b*. With reference to FIG. 2, flasher 55 includes a bimetallic breaker 56 having a make and break contact 56*a*.

When cap 52 is inserted into receptacle 51 and on-off switch 50 is closed, light bulb 28 will glow continuously. If cap 52 is removed and flasher 55 inserted in its place, the current passing through bimetallic breaker 56 will cause it to expand and open the circuit, thereby extinguishing light bulb 28. As the breaker 56 cools, it will again touch contact 56*a* and conduct current to bulb 28. This cycle is repeated continuously so that bulb 28 flashes periodically. If desired, flasher 55 could also be suspended from housing 12 by means of a chain (not shown) similar to chain 54.

If the lamp 10 is utilized for illumination purposes in making vehicle repairs, cap 52 is inserted in receptacle 51 and lamp 10 may either by hung by means of hook 30 or held in the hand of the user. For use as an emergency flasher, the lamp 10 may again be hung on hook 30 or hand held, but in this case, flasher 55 will be inserted in place of cap 52.

The embodiment of the invention shown in FIG. 3 permits the hand lamp 10, either in its illumination mode or in its emergency flasher mode, to be utilized when jumping the battery of a disabled vehicle. The assembly comprises a first pair of battery clamps 58 and 60 having heavy gauge insulated cables 62 and 64, which are similar to cables 36 and 38, terminating in a double female connector 66. Connector 66 has a first receptacle having slots 68, 70 and 72 on one end 74 and a second identical receptacle 76 on its side 78. Receptacle 76 has three slots (not shown) which are arranged in a similar fashion to that of slots 68, 70 and 72 and is adapted to mate with male connector 40 which in turn is connected over power cord 18 to lamp 10 as shown in FIG. 1.

A second pair of battery terminal clamps 80 and 82 are connected to connector 84 over a pair of heavy gauge insulated cables 86 and 88. Connectors 66, 40 and 84 are of the twist-to-lock type as described in connection with FIG. 1. Blades 90, 92 and 94 of connector 84 are shaped and arranged such that they can be inserted into slots 68, 70 and 72 in one way only thereby assuring proper positive and negative polarity between clamps 58, 60 and 80, 82. As in the case with the embodiment shown in FIG. 1, connectors 66, 40 and 84 may be of the two-conductor type as an alternative to the embodiment of FIG. 3 wherein one of the blades 90, 92 or 94 is carried as a dummy.

In use, the two sets of battery clamps 58, 60 and 80, 82 are connected, respectively, to the battery terminals of a charged battery and a disabled battery and the lamp connector 40 is plugged into receptacle 76. Lamp 10 is powered by the batteries (not shown) to which clamps 58, 60 and 80, 82 are connected and may be utilized either as a source of illumination or an emergency flasher. Obviously, other appliances may be plugged into receptacle 76, if desired.

Various other features may be included in the apparatus described above. For example, a battery condition meter may be connected across leads 36 and 38; 62 and 64; or 86 and 88 or in the lamp circuit itself. Also, the various circuits may be fused so that overcurrent conditions are prevented. If it is desired to utilize lamp 10 as a remote voltage source, bulb 28 may be removed and a standard two-slot receptacle capable of receiving standard two-blade plugs may be screwed in the socket. This would enable any type of DC appliance or equipment to receive current over power cord 18. For example, circuit continuity probes which are often used in diagnosing electrical circuit problems in vehicles, may be connected to the battery by plugging them into this receptacle.

While there have been described above the principles of this invention in connection with specific apparatus, it is to be clearly understood that this description is made only by way of example and not as a limitation to the scope of the invention.

What is claimed is:

1. A DC trouble lamp comprising:
- a housing having a handle portion,
- an electric light bulb socket in said housing having a direct current light bulb received therein,
- a curved translucent shade connected to said housing and being positioned behind said bulb, said shade being of a highly visible color,
- a protective cage being positioned in front of said bulb,
- a hook secured to said lamp,
- a power cord electrically connected to said socket for supplying electric current thereto,
- a pair of heavy gauge insulated electrical leads each terminating in a spring biased, manually operated battery terminal clamp at one end thereof,
- first and second cooperating separable connectors electrically connected respectively to one end of said power cord and to the free ends of said leads, said connectors including means for positively locking them together,
- said power cord being of a substantially lighter gauge and of a substantially longer length than said leads, and
- selectively operable flasher means in said housing for periodically interrupting the supply of electric current to said light bulb.

2. The trouble lamp of claim 1 wherein said electrical connectors include means whereby locking is achieved by relative rotation of said connectors in opposite directions.

3. The trouble lamp of claim 1 further including:
- a second pair of heavy gauge electrical leads each terminating in a spring biased, manually operated battery terminal clamp at one end and a third electrical connector at the other end thereof,
- said second connector includes means for electrically connecting said third connector to said first mentioned leads, said third connector being separable from said second connector.

4. The trouble lamp of claim 3 wherein said power cord is approximately No. 18 gauge wire and said leads are approximately No. 10 gauge wire.

5. A DC trouble lamp comprising:
- a housing having a handle portion,
- an electric light bulb socket in said housing having a direct current bulb received therein,
- a translucent shade connected to said housing and being positioned behind said bulb, said shade being of a highly visible color,
- a protective cage being positioned in front of said bulb,
- a power cord electrically connected to said socket for supplying electric current thereto,
- a pair of spring biased, manually operated battery terminal clamps electrically connected to said power cord,
- manually operable switch means in series with said socket,
- an external open circuit receptacle in series with said socket, said receptacle including two recessed contact elements electrically connected respectively to said power cord and said socket, and
- a protective cover for said receptacle being separable therefrom and having means comprising a pair of electrically short-circuited contact blades adapted to be inserted into said receptacle and make electrical contact with said recessed contact elements thereby electrically bridging said receptacle.

6. The trouble lamp of claim 5 and including flasher means separable from said receptacle for periodically interrupting the supply of electric current to said socket, said flasher including contact blades adapted to be inserted within said receptacle and make electrical contact with said recessed contact elements whereby said flasher is series connected to said socket.

* * * * *